US012472745B2

(12) United States Patent
Kawakami

(10) Patent No.: US 12,472,745 B2
(45) Date of Patent: Nov. 18, 2025

(54) IMAGE FORMING APPARATUS AND IMAGE FORMING METHOD

(71) Applicant: Konica Minolta, Inc., Tokyo (JP)

(72) Inventor: Hajime Kawakami, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 171 days.

(21) Appl. No.: 18/366,993

(22) Filed: Aug. 8, 2023

(65) Prior Publication Data

US 2024/0092083 A1 Mar. 21, 2024

(30) Foreign Application Priority Data

Sep. 16, 2022 (JP) ................................ 2022-148431

(51) Int. Cl.
*B41J 2/165* (2006.01)
*B41J 2/21* (2006.01)

(52) U.S. Cl.
CPC ....... *B41J 2/16535* (2013.01); *B41J 2/16538* (2013.01); *B41J 2/16552* (2013.01); *B41J 2/2114* (2013.01); *B41J 2/16541* (2013.01); *B41J 2002/16558* (2013.01); *B41J 2002/16573* (2013.01)

(58) Field of Classification Search
CPC ......................... B41J 2/16535; B41J 2/16538; B41J 2/16552; B41J 2/2114; B41J 2/16541; B41J 2002/16558; B41J 2002/16573
See application file for complete search history.

(56) References Cited

U.S. PATENT DOCUMENTS 6,460,967 B1 * 10/2002 Makita ................ B41J 2/16552 347/33
2008/0238984 A1 * 10/2008 Yahiro ................ B41J 2/16552 347/28

FOREIGN PATENT DOCUMENTS

JP H07-214784 A 8/1995
JP 2005-225203 A 8/2005
JP 2012232424 A 11/2012

OTHER PUBLICATIONS

European Patent Office, "Extended European Search Report", dated Feb. 5, 2024, which was issued in connection with the related European patent application No. 23196827.2, 9 pages.

* cited by examiner

*Primary Examiner* — Geoffrey S Mruk
(74) *Attorney, Agent, or Firm* — LUCAS & MERCANTI, LLP

(57) ABSTRACT

An image forming apparatus that discharges droplets, while moving a recording head relative to a recording medium in a main scanning direction and a sub-scanning direction, to form an image, includes: a carriage; a first recording head that has a first discharge face having a hole, is disposed on the carriage, and discharges a first droplet containing resin through the hole; a second recording head that has a second discharge face having a hole, is disposed on the carriage, and discharges, through the hole, a second droplet containing resin less than the resin contained in the first droplet; a first cleaning device that wipes the first discharge face to clean the first recording head; and a second cleaning device that is different from the first cleaning device and that wipes the second discharge face to clean the second recording head.

19 Claims, 11 Drawing Sheets

IMAGE FORMING APPARATUS AND IMAGE FORMING METHOD

The entire disclosure of Japanese patent Application No. 2022-148431, filed on Sep. 16, 2022, is incorporated herein by reference in its entirety.

BACKGROUND

Technological Field

The present invention relates to an image forming apparatus and an image forming method.

Description of the Related Art

Conventionally, as an inkjet image forming apparatus with an ink containing a binder resin, has been known an apparatus that forms an image by flocculating an ink and a flocculant not containing a binder resin as a pretreatment liquid on the surface of a recording medium in order to prevent penetration of the ink into the recording medium. An ink head for such an image formation has an ink discharge face and an ink adheres thereto, so that the adhered ink is cleaned periodically (for example, see JP 7-214784 A and JP 2005-225203 A).

An inkjet recording apparatus including a cleaning device with a cleaning blade is disclosed in JP 7-214784 A. The cleaning device makes the rigidity of the cleaning blade different for each of a plurality of recording heads to clean the plurality of recording heads.

A cleaning device that cleans a plurality of droplet discharge heads (recording heads) is disclosed in JP 2005-225203 A. The cleaning device includes a cleaning roller and a cleaning blade for cleaning the plurality of droplet discharge heads. The cleaning device in JP 7-214784 A cleans each of the plurality of droplet discharge heads with a cleaning roller and the cleaning blade.

In order to enhance adhesion to a recording medium, such an image forming apparatuses as described in JP 7-214784 A and JP 2005-225203 A typically uses an ink containing a binder resin high in adhesive force.

If the image forming apparatus in JP 7-214784 A uses an ink high in adhesive strength, it is difficult to remove the ink dried and fixed to a nozzle face. In this case, it is conceivable to increase the pressure of the cleaning blade brought into contact with the nozzle face, but the durability of the recording heads is lowered.

In addition, such a cleaning device with a cleaning roller and a cleaning blade as described in the JP 2005-225203 cleans a recording head less frequent in cleaning. As a result, excessive maintenance is performed, which increases the maintenance cost.

SUMMARY

An object of the present invention is to provide an image forming apparatus and an image forming method that enable reduction in maintenance cost without excessive maintenance.

To achieve the abovementioned object, according to an aspect of the present invention, an image forming apparatus that discharges droplets, while moving a recording head relative to a recording medium in a main scanning direction and a sub-scanning direction, to form an image, reflecting one aspect of the present invention comprises: a carriage; a first recording head that has a first discharge face having a hole, that is disposed on the carriage, that discharges a first droplet containing resin through the hole, and that is included in the recording head; a second recording head that has a second discharge face having a hole, that is disposed on the carriage, that discharges, through the hole, a second droplet containing resin less than the resin contained in the first droplet, and that is included in the recording head; a first cleaning device that wipes the first discharge face to clean the first recording head; and a second cleaning device that is different from the first cleaning device and that wipes the second discharge face to clean the second recording head.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, respective image forming apparatuses according to one or more embodiments of the present invention will be described with reference to the drawings. However, the scope of the invention is not limited to the disclosed embodiments.

First Embodiment (Configuration of Image Forming Apparatus)

Figure 1A:
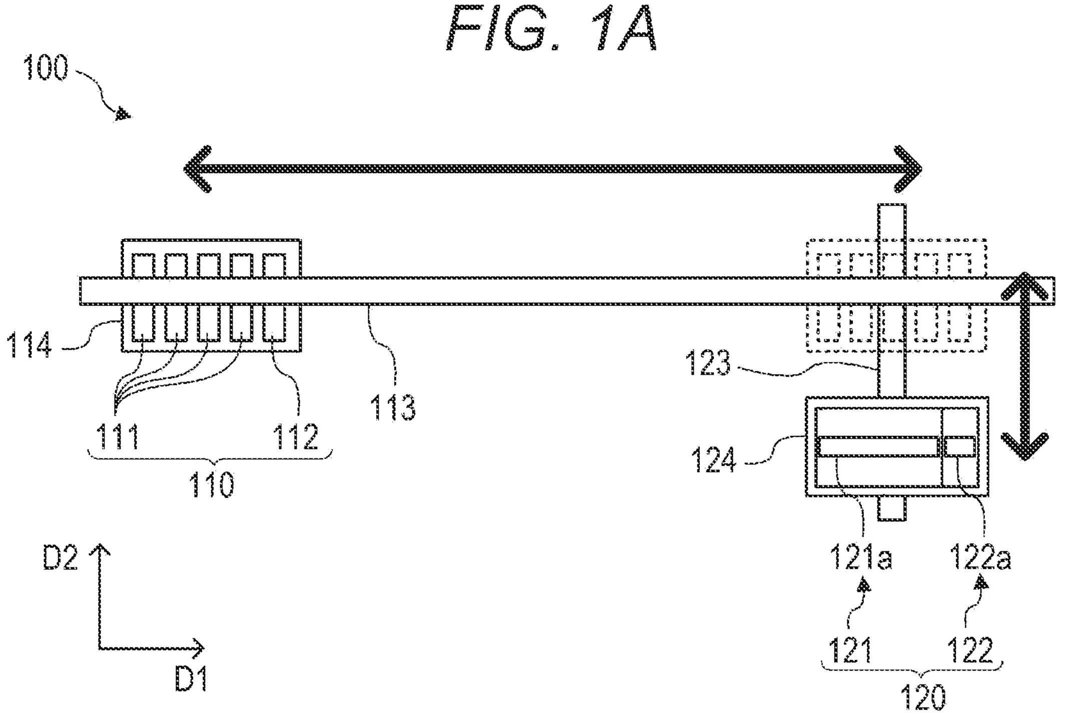
FIGS. 1A and 1B illustrate the configuration of an image forming apparatus according to a first embodiment of the present invention.
Figure 1B:
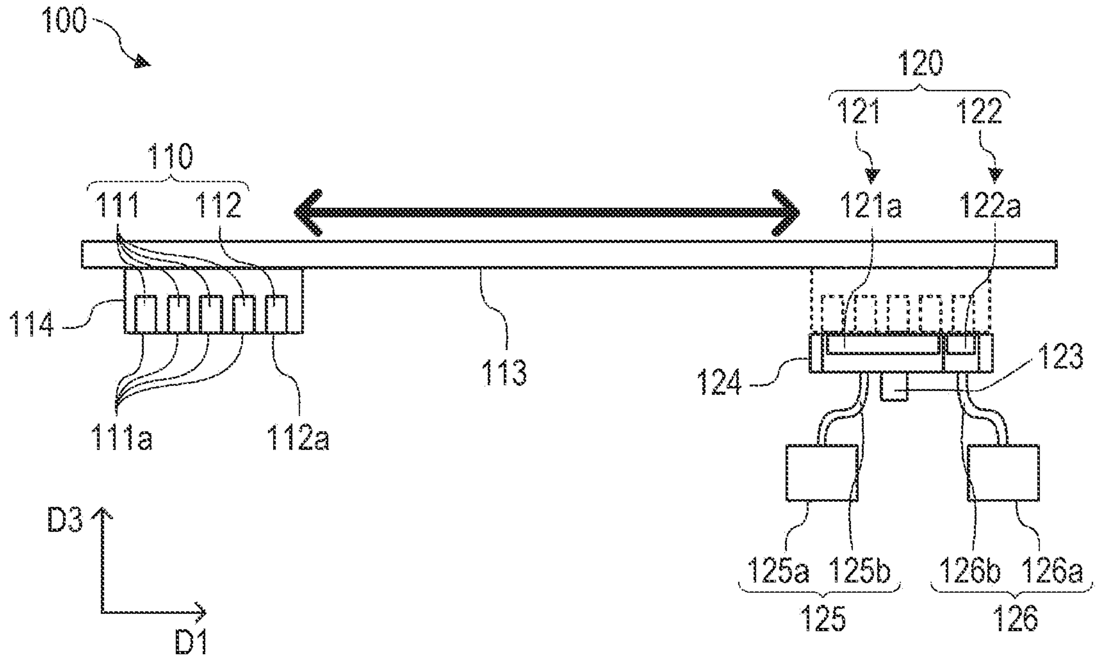
Figure 2:
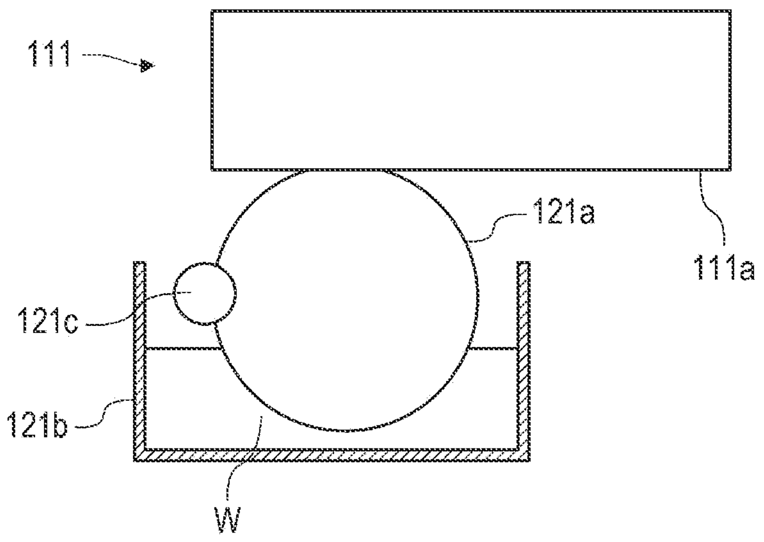
FIG. 2 is a schematic sectional view of a first cleaning device.

FIGS. 1A and 1B illustrates the configuration of an image forming apparatus 100 according to a first embodiment of the present invention. FIG. 1A is a plan view of the image forming apparatus 100, and FIG. 1B is a side view thereof. FIG. 2 is a schematic sectional view of a first cleaning device.

As illustrated in FIGS. 1A and 1B, the image forming apparatus 100 includes a recording head 110 including a plurality of recording heads and a cleaning device 120 including a plurality of cleaning devices. In the present embodiment, the image forming apparatus 100 is an inkjet image forming apparatus, and discharges droplets while moving the recording head 110 relative to a recording medium in the main scanning direction (first direction) D1 and the sub-scanning direction (second direction) D2. In the present embodiment, the main scanning direction D1 is a direction orthogonal to the sub-scanning direction D2.

The droplets form an image on the surface of the recording medium. Examples of the recording medium include recording media typically used for inkjet recording, such as paper, fabric, plastic films, and glass plates. The recording medium may be a sheet-shaped medium cut in a predetermined size, or may be a long medium that is wound like a roll and can be fed continuously.

The image forming apparatus 100 may form an image on a recording medium with the recording head 110 fixed or with the recording medium fixed. In the present embodiment, the recording medium intermittently movable in the sub-scanning direction D2 by a conveying device (not illustrated), and the recording head 110 is movable in the main scanning direction D1. In the present embodiment, the cleaning device 120 is movable at least in the sub-scanning direction D2.

The recording head 110 includes a first recording head 111 and a second recording head 112. The first recording head 111 and the second recording head 112 are mounted on a first carriage 114 movable on a first rail 113 bridged in the width direction of the recording medium. The first recording head 111 and the second recording head 112 reciprocate in the main scanning direction D1 as the first carriage 114 reciprocates in the main scanning direction D1.

The first recording head 111 has a first discharge face 111*a* having a hole through which a first droplet is discharged. The first droplet is a so-called ink containing a resin. The number of first recording heads 111 is not particularly limited. The number of first recording heads 111 is appropriately set in response to the color type of the first droplet to be discharged. In the present embodiment, the number of first recording heads 111 is four. The first recording heads 111 each discharge the first droplet through the hole of the first discharge face 111*a* while moving in the main scanning direction D1, thereby recording a desired image onto the recording medium intermittently moved in the sub-scanning direction D2.

The second recording head 112 has a second discharge face 112*a* having a hole through which a second droplet is discharged. The second droplet contains less resin than the resin contained in the first droplet. The second droplet preferably contains no resin. In the present embodiment, the second droplet is a flocculant for aggregating the first droplet or an overcoat liquid. The number of second recording heads 112 is not particularly limited. In the present embodiment, the number of second recording heads 112 is one. The second recording head 112 discharges the second droplet through the hole of the second discharge face 112*a* to the recording medium while moving in the main scanning direction D1. Due to the discharge of the second droplet to the recording medium to which the first droplet has been discharged, the first droplet is aggregated by the second droplet to be fixed to the recording medium. The first droplet may be discharged immediately after the second droplet is discharged. In a case where a flocculant and an overcoat liquid are each discharged from the second recording head 112, the number of second recording heads 112 is two. Alternatively, the overcoat liquid may be discharged from the first recording head 111 in response to the amount of resin contained in the overcoat liquid.

The array of the first recording heads 111 and the second recording head 112 on the first carriage 114 is not particularly limited. In the present embodiment, the recording head 110 includes the first recording head 111, the first recording head 111, the first recording head 111, and the second recording head 112 disposed in this order in view along the main scanning direction D1.

The cleaning device 120 includes a first cleaning device 121 and a second cleaning device 122. The cleaning device 120 may be movable in the main scanning direction D1, may be movable in the sub-scanning direction D2, or may be fixed. The first cleaning device 121 and the second cleaning device 122 may be movable individually or simultaneously. In the present embodiment, the first cleaning device 121 and the second cleaning device 122 are mounted on a second carriage 124 movable on a second rail 123 disposed along the sub-scanning direction D2. Namely, the first cleaning device 121 and the second cleaning device 122 may be movable simultaneously. The first cleaning device 121 and the second cleaning device 122 reciprocate in the sub-scanning direction D2 as the second carriage 124 reciprocates in the sub-scanning direction D2. In a case where the first cleaning device 121 and the second cleaning device 122 are movable individually, the first cleaning device 121 and the second cleaning device 122 are mounted on separate carriages (not illustrated).

The first cleaning device 121 wipes a first droplet having adhered to the first discharge face 111*a* of each first recording head 111. The configuration of the first cleaning device 121 is not particularly limited as long as the above function can be exhibited. The first cleaning device 121 includes a first cleaning member 121*a*. As illustrated in FIG. 2, the first cleaning device 121 in the present embodiment includes a container 121*b* with the cleaning liquid W stored therein and a squeeze member 121*c* in addition to the first cleaning member 121*a*. The first cleaning member 121*a* preferably has a surface layer formed of a moisture-absorbable elastic member, from the viewpoint of removing the first droplet. Examples of the first cleaning member 121*a* include a wet roller (sponge) and a wet web (nonwoven fabric). From the viewpoint of wiping the first discharge face 111*a* to which the first droplet containing resin has been adhered, the first cleaning member 121*a* is preferably a wet roller having a removing force (strong cleaning force) that increases depending on the rotational speed (the faster is stronger) and the rotational direction (the direction counter to the movement direction of the first cleaning device 121 is stronger).

One first cleaning device 121 may be disposed for one first recording head 111, or one first cleaning device may be disposed for a plurality of first recording heads 111. In the present embodiment, the first cleaning device 121 is disposed for the four first recording heads 111. Namely, in the present embodiment, the first cleaning device 121 is provided so as to be able to collectively clean the four first recording heads 111.

In the present embodiment, the first cleaning device 121 is movable in the sub-scanning direction D2. At the time of image formation, the first cleaning device 121 is disposed at a position different from a position corresponding to the first discharge faces 111*a* of the first recording heads 111. At the time of no image formation, the first cleaning device 121 moves to the position corresponding to the first discharge faces 11*a* of the first recording heads 111 to clean the first recording heads 111. FIG. 1A exemplarily illustrates the first cleaning device 121 disposed away from the first recording heads 111 in the conveyance direction (sub-scanning direction D2) of the recording medium.

The first cleaning device 121 is connected to a first waste-liquid container 125. The first waste-liquid container 125 disposes the first waste liquid having been wiped by the first cleaning member 121*a*. The configuration of the first waste-liquid container 125 is not particularly limited as long as the above function can be exhibited. In the present embodiment, the first waste-liquid container 125 includes a first waste-liquid tank 125*a*, and a first connection passage 125*b* that connects the first cleaning device 121 and the first waste-liquid tank 125*a*.

The second cleaning device 122 wipes the second droplet having adhered to the second discharge face 112*a* of the second recording head 112. The configuration of the second cleaning device 122 is not particularly limited as long as the above function can be exhibited. The second cleaning device 122 includes a second cleaning member 122*a*. Examples of the second cleaning member 122*a* include a dry blade (rubber member) and a dry web. From the viewpoint of wiping the second discharge face 112*a* to which the second droplet containing no resin has been adhered, the second cleaning member 122*a* is preferably a dry blade that reduces the head load and eliminates excessive maintenance.

One second cleaning device 122 may be disposed for one second recording head 112, or one second cleaning device may be disposed for a plurality of second recording heads 112. In the present embodiment, the number of second recording heads 112 is one and the number of second cleaning devices 122 is one.

In the present embodiment, the second cleaning device 122 is movable in the sub-scanning direction D2. At the time of image formation, the second cleaning device 122 is disposed at a position (standby position) different from a position corresponding to the second discharge face 112*a* of the second recording head 112. At the time of no image formation, the second cleaning device 122 moves to the position corresponding to the second discharge face 112*a* of the second recording head 112 to clean the second recording head 112. FIG. 1A exemplarily illustrates the second cleaning device 122 disposed away from the second recording head 112 in the conveyance direction (sub-scanning direction D2) of the recording medium. The second cleaning device 122 may be movable in the height direction D3 orthogonal to the main scanning direction D1 and the sub-scanning direction D2. In the present embodiment, the second cleaning device 122 is movable in the sub-scanning direction D2 and the height direction D3.

The second cleaning device 122 is connected to a second waste-liquid container 126. The second waste-liquid container 126 disposes the second waste liquid having been wiped by the second cleaning member 122*a*. The configuration of the second waste-liquid container 126 is not particularly limited as long as the above function can be exhibited. In the present embodiment, the second waste-liquid container 126 includes a second waste-liquid tank 126*a* and a second connection passage 126*b* that connects the second cleaning device 122 and the second waste-liquid tank 126*a*.

The cleaning force of the first cleaning device 121 to such a first recording head 111 as described above is preferably stronger than the cleaning force of the second cleaning device 122 to the second recording head 112. As described above, the first cleaning device 121 wipes the first droplet containing the resin, and the second cleaning device 122 wipes the second droplet containing no resin. Thus, the recording head 110 is not excessively maintained, so that the discharge face of the recording head 112 is not excessively worn.

Figure 3:
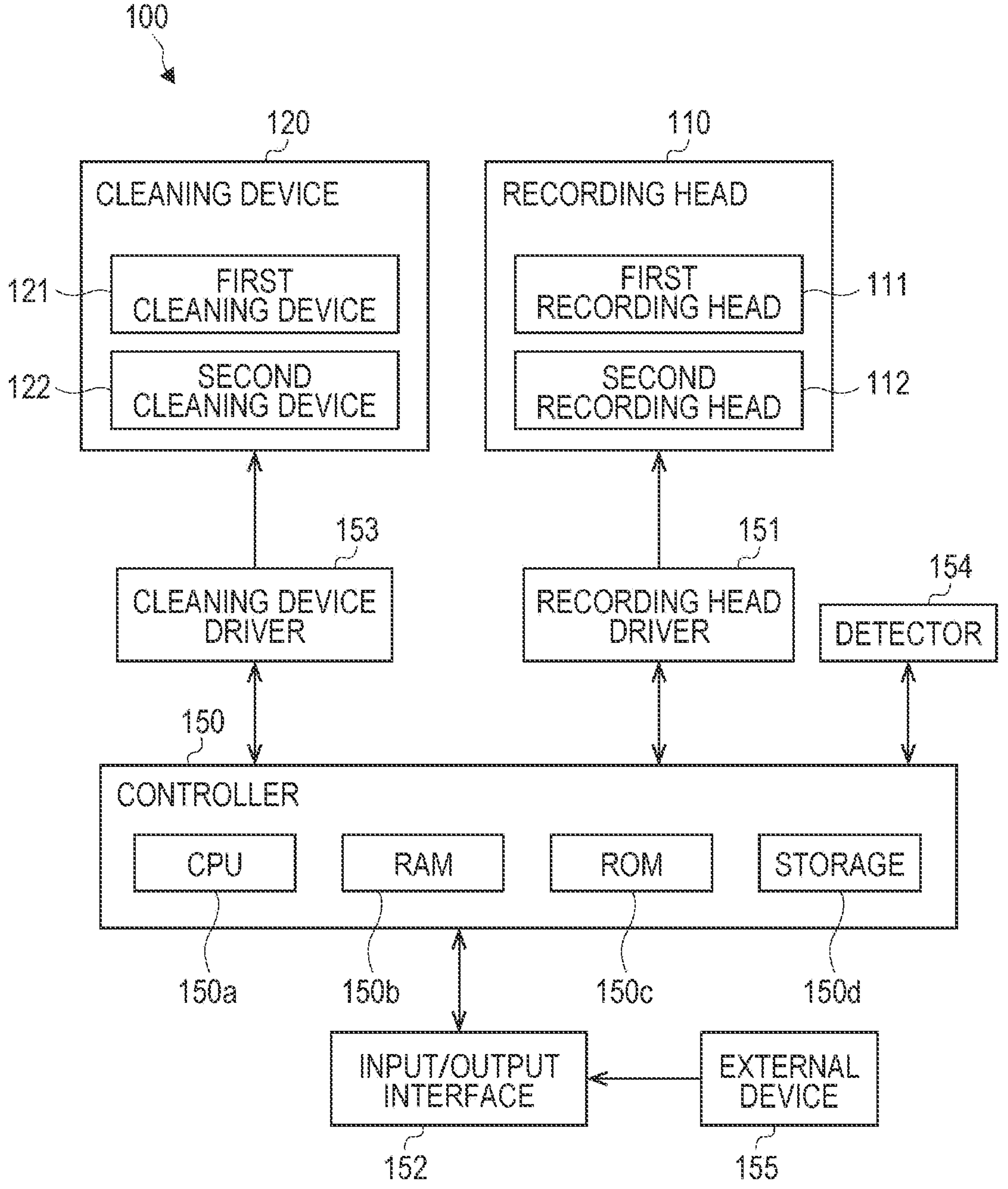
FIG. 3 is a block diagram illustrating the main part of a control system according to the present embodiment.

FIG. 3 is a block diagram illustrating the main functional configuration of the image forming apparatus 100. The image forming apparatus 100 includes a controller 150, a recording head driver 151, an input/output interface 152, a cleaning device driver 153, and a detector 154.

The controller 150 includes a central processing unit (CPU) 150*a*, a random access memory (RAM) 150*b*, a read only memory (ROM) 150*c*, and a storage 150*d*.

The CPU 150*a* reads various control programs and setting data stored in the ROM 150*c*, stores the programs and the setting data in the RAM 150*b*, and executes the programs to perform various types of arithmetic processing. Further, the CPU 150*a* centrally controls the entire operation of the image forming apparatus 100.

The RAM 150*b* provides the CPU 150*a* with a working memory space and stores temporary data. The RAM 150*b* may include a non-volatile memory.

The ROM 150*c* stores, for example, the various control programs executed by the CPU 150*a* and the setting data. Instead of the ROM 150*c*, a rewritable non-volatile memory such as an electrically erasable programmable read only memory (EEPROM) or a flash memory may be used.

The storage 150*d* stores a print job (image recording command) input from an external device 155 through the input/output interface 152, and image data related to the print job and cleaning data. As the storage 150*d*, for example, a hard disk drive (HDD) may be used, or a dynamic random access memory (DRAM) may be used in combination.

Under the control of the controller 150, the recording head driver 151 supplies a drive signal corresponding to image data to such a first recording head 111 as described above and the second recording head 112 at suitable timing, thereby causing each nozzle of the first recording head 111 and the second recording head 112 to discharge the first droplet and the second droplet in an amount corresponding to the pixel value of the image data.

The input/output interface 152 mediates transmission and reception of data between the external device 155 and the controller 150. The input/output interface 152 includes, for example, any of various serial interfaces and various parallel interfaces, or a combination thereof.

The external device 155 is, for example, a personal computer, and supplies an image recording command (print job), image data, and the like to the controller 150 through the input/output interface 152.

Under the control of the controller 150, the cleaning device driver 153 causes the first cleaning device 121 and the second cleaning device 122 to move, at suitable timing, according to the cleaning data stored in the storage 150*d* to clean the first recording heads 111 and the second recording head 112.

The detector 154 detects the position of the first carriage 114 and detects the number of times of cleaning of the cleaning device 120. The detector 154 includes, for example, various sensors.

Image Forming Method and Cleaning Operation

Figure 4A:
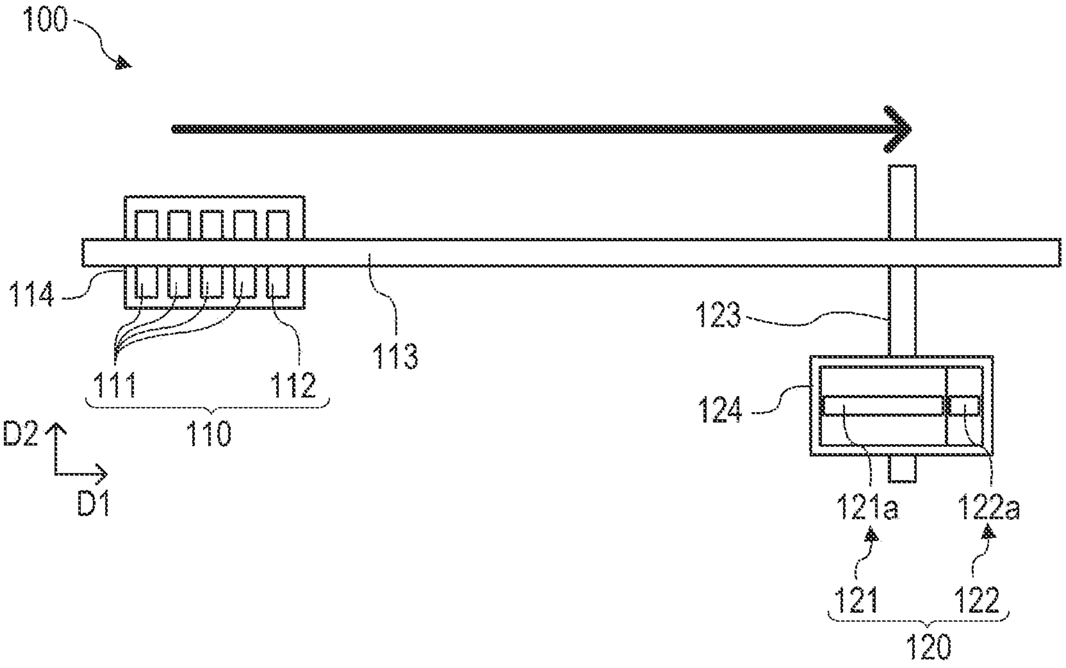
FIGS. 4A and 4B explanatorily illustrate a cleaning operation of the image forming apparatus according to the first embodiment.
Figure 4B:
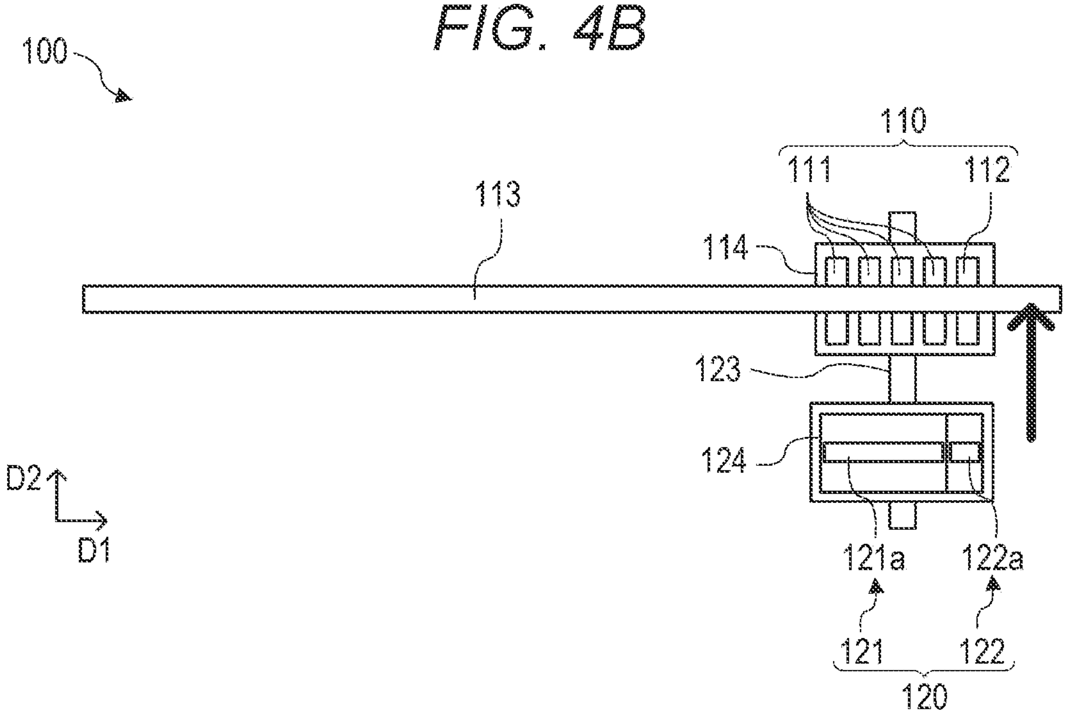
Figure 5:
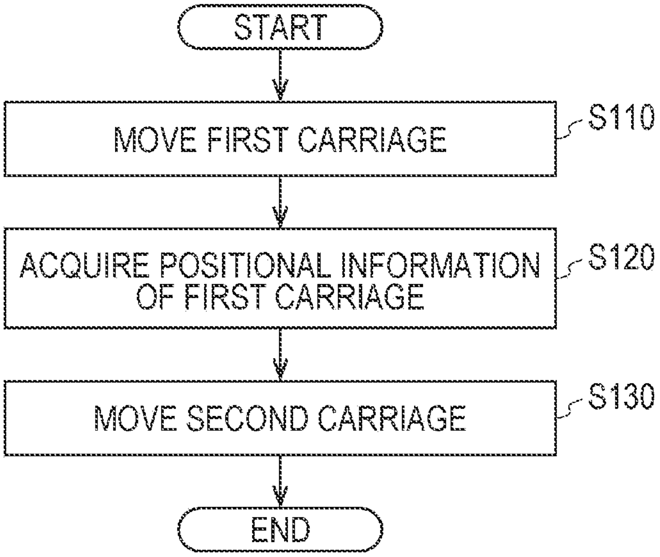
FIG. 5 is a flowchart illustrates the cleaning operation of the image forming apparatus according to the first embodiment.

Next, an image forming method and a cleaning operation with the image forming apparatus 100 will be described. FIGS. 4A and 4B explanatorily illustrate the cleaning operation. FIG. 5 is a flowchart illustrates the cleaning operation.

Here, in the image forming apparatus 100, the first carriage 114 (such first recording heads 111 as described above and the second recording head 112) is movable in the main scanning direction D1, and a recording medium and the second carriage 124 (the first cleaning device 121 and the second cleaning device 122) are movable in the sub-scanning direction D2.

The image forming method with the image forming apparatus 100 includes discharging droplets, with the first recording heads 111 and the second recording head 112 moving relative to the recording medium in the main scanning direction D1 and the sub-scanning direction D2, to form an image; wiping, by the first cleaning device 121, the first discharge faces 11*a* to clean the first recording heads 111; and wiping, by the second cleaning device 122, the second discharge face 112*a* to clean the second recording head 112.

In the image formation, while the first carriage 114 scans in the main scanning direction (forward operation), first droplets are discharged from the first recording heads 111 and second droplets are discharged from the second recording head 112 to form an image onto the recording medium. At this time, because the first droplets are discharged immediately after the second droplets are discharged, the first droplets are mixed with the second droplets and aggregated on the recording medium. After the recording medium is moved in the sub-scanning direction D2, while the first carriage 114 scans in the main scanning direction D1 (backward operation), first droplets are discharged from the first recording heads 111 and second droplets are discharged from the second recording head 112 to form an image on the recording medium. Then, the recording medium is moved in the sub-scanning direction D2. Repetition of this operation results in image formation with the first droplets and the second droplets on the recording medium.

The recording head 110 is cleaned before image formation is performed or when no image formation is performed after image formation.

As illustrated in FIGS. 4A and 5, the controller 150 causes the first carriage 114 to move a position where cleaning is to be performed (S110). As a result, the first recording heads 111 and the second recording head 112 move to a position where the cleaning is to be performed. Next, the controller 150 causes the detector 154 to acquire positional information of the first carriage 114 (S120).

Then, as illustrated in FIGS. 4B and 5, the controller 150 having detected that the first carriage 114 is disposed at the position where the cleaning is to be performed causes the second carriage 124 to move in the sub-scanning direction D2 (forward operation) (S130). As a result, the first cleaning member (wet roller) 121*a* of the first cleaning device 121 wipes the first discharge faces 111*a* of the first recording heads 111, and the second cleaning member (dry blade) 122*a* of the second cleaning device 122 wipes the second discharge face 112*a* of the second recording head 112. In the present embodiment, the timing at which the first cleaning device 121 wipes the first recording heads 111 is the same as the timing at which the second cleaning device 122 wipes the second recording head 112. In such a manner, because the first recording heads 111 are wiped by the dedicated first cleaning device 121 and the second recording head 112 is wiped by the dedicated second cleaning device 122, excessive maintenance is not performed.

Then, the controller 150 causes the second carriage 124 to move in the sub-scanning direction D2 (backward operation).

The second carriage 124 may reciprocate a plurality of times in the sub-scanning direction D2. As a result, even in a case where the first droplets having firmly adhered to the first discharge faces 11*a*, the first discharge faces 111*a* can be wiped.

The timing at which the first cleaning device 121 cleans the first recording heads 111 may be different from the timing at which the second cleaning device 122 cleans the second recording head 112.

Figure 6:
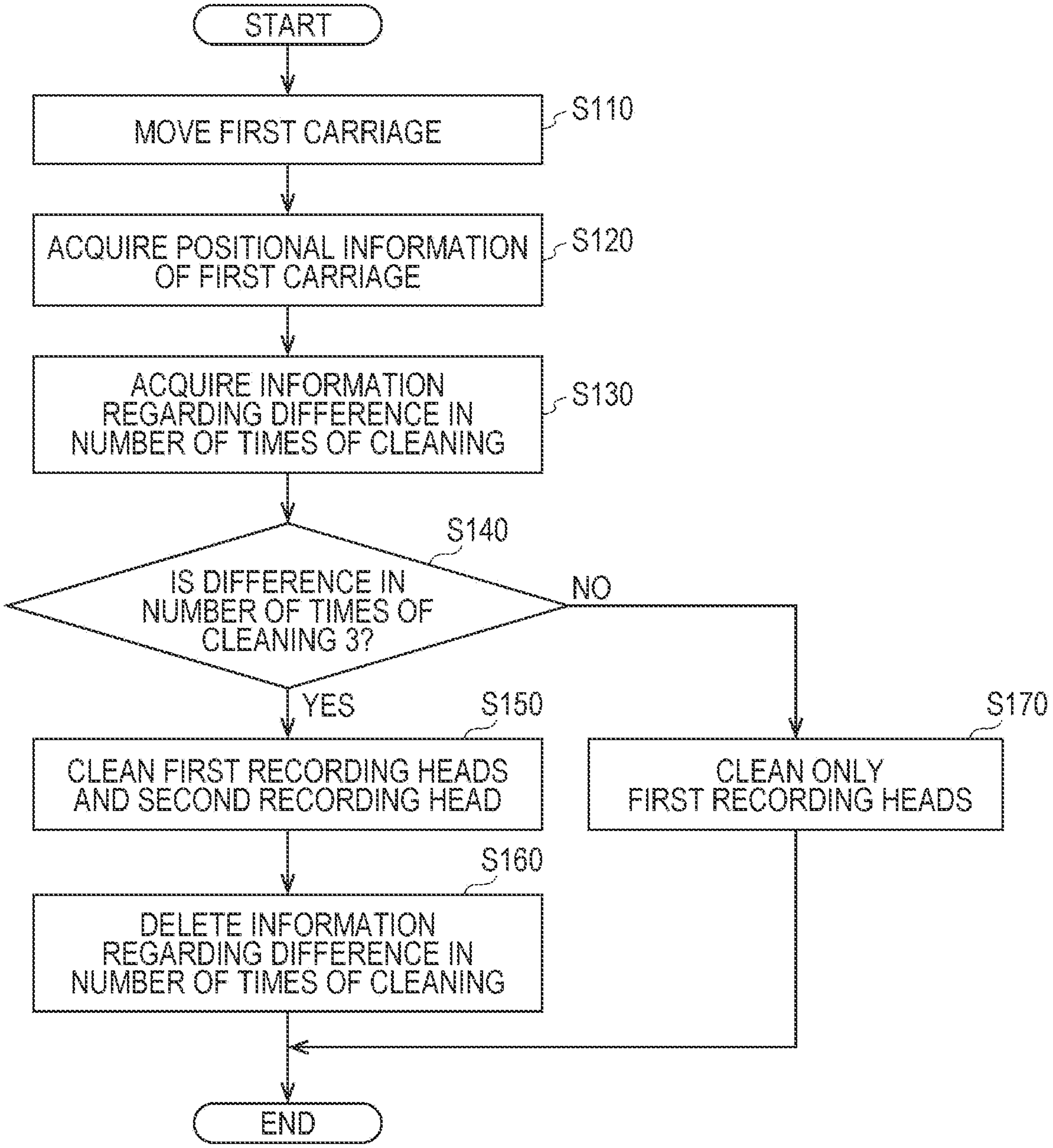
FIG. 6 is an explanatory flowchart illustrating a cleaning operation different in cleaning timing.
Figure 7:
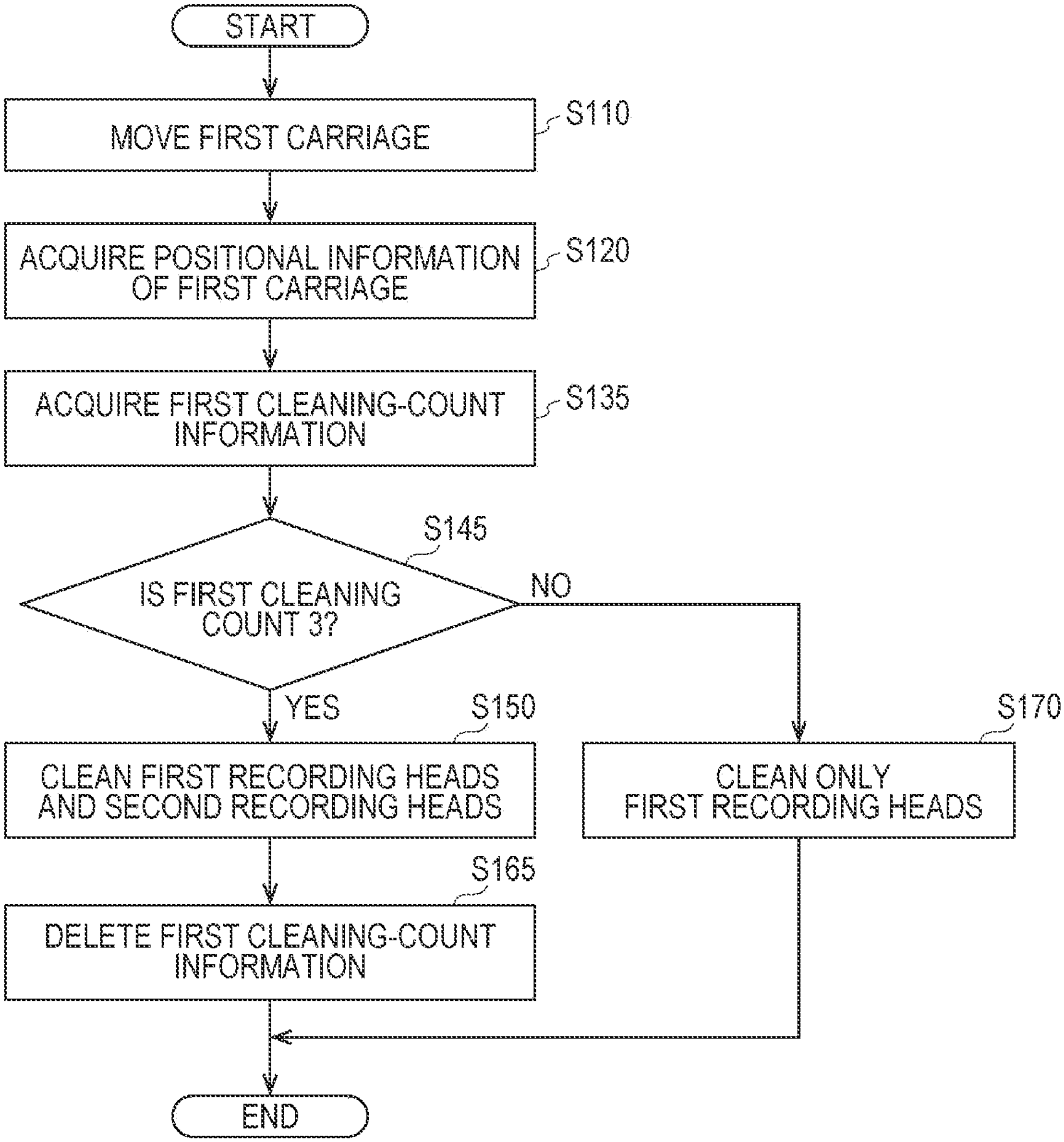
FIG. 7 is another explanatory flowchart illustrating a cleaning operation different in cleaning timing.

FIGS. 6 and 7 are explanatory flowcharts each illustrating the timing at which the first cleaning device 121 cleans the first recording heads 111 is different from the timing at which the second cleaning device 122 cleans the second recording head 112.

As illustrated in FIG. 6, the controller 150 causes the first carriage 114 to move (S110), acquires positional information of the first carriage 114 having moved (S120), and then acquires information regarding a difference in the number of times of cleaning (S130). Then, the controller 150 detects whether or not the difference in the number of times of cleaning is 3 (S140). If the difference in the number of times of cleaning is 3, the first recording heads 111 and the second recording head 112 are cleaned (S150). After the cleaning of the first recording heads 111 and the second recording head 112, the information regarding the difference in the number of times of cleaning is deleted (S160). If the difference in number of times of cleaning is less than 3, the first recording heads 111 are cleaned (S170). Specifically, when the controller 150 causes the second carriage 124 to move in the sub-scanning direction D2, the second cleaning device 122 is retracted in the height direction D3 so as not to come into contact with the second recording head 112. In such a manner, the second cleaning device 122 moves in the height direction D3, so that the wiping timing can be adjusted even if the first cleaning device 121 and the second cleaning device 122 move simultaneously.

Alternatively, first cleaning-count information may be acquired to adjust the timing of cleaning. As illustrated in FIG. 7, the controller 150 causes the first carriage 114 to move (S110), acquires positional information of the first carriage 114 having moved (S120), and then acquires the first cleaning-count information (S135). The first cleaning-count information is the number of times of cleaning of the first recording heads 111 performed by the first cleaning device 121. Then, the controller 150 detects whether or not the first cleaning count is 3 (S145). If the first cleaning count is 3, the first recording heads 111 and the second recording head 112 are cleaned (S150). After the cleaning of the first recording heads 111 and the second recording head 112, the first cleaning-count information is deleted (S165). If the first cleaning count is less than 3, the first recording heads 111 are cleaned (S170). Specifically, when the controller 150 causes the second carriage 124 to move in the sub-scanning direction D2, the second cleaning device 122 is retracted in the height direction D3 so as not to come into contact with the second recording head 112. In such a manner, the second cleaning device 122 moves in the height direction D3, so that the wiping timing can be adjusted even if the first cleaning device 121 and the second cleaning device 122 move simultaneously.

The difference in the number of times of cleaning can be appropriately changed to an optimum difference according to, for example, the size of the image forming apparatus 100, or the type of the first droplet and the second droplet. Here, whether to wipe the first recording heads 111 or to wipe both the first recording heads 111 and the second recording head 112 is set on the basis of the number of times of cleaning. However, the setting may not be set on the basis of the number of times of cleaning. For example, it may be set on the basis of the storage amounts of the first waste-liquid tank 125*a* and the second waste-liquid tank 126*a*. In this case, the first waste-liquid tank 125*a* and the second waste-liquid tank 126*a* each include a liquid-level detection sensor (not illustrated) that detects the liquid level. Further, each of the first cleaning device 121 and the second cleaning device 122 may be forcibly driven.

Effects

As described above, according to the image forming apparatus 100 of the present embodiment, the first recording heads 111 are cleaned by the first cleaning device 121 and the second recording head 112 is cleaned by the second cleaning device 122, so that the maintenance cost can be reduced without excessive maintenance.

Second Embodiment

Next, an image forming apparatus 200 according to a second embodiment will be described. The image forming apparatus 200 of the present embodiment includes a recording head 110 on a first carriage 214. The recording head 110 on the first carriage 214 is different in disposition from the recording head 110 on the first carriage 114 of the image forming apparatus 100 of the first embodiment. The components of the image forming apparatus 200 similar to those of the image forming apparatus 100 of the first embodiment are denoted with the same reference signs, and thus the description thereof will not be given.

(Configuration and Cleaning Operation of Image Forming Apparatus)

Figure 8A:
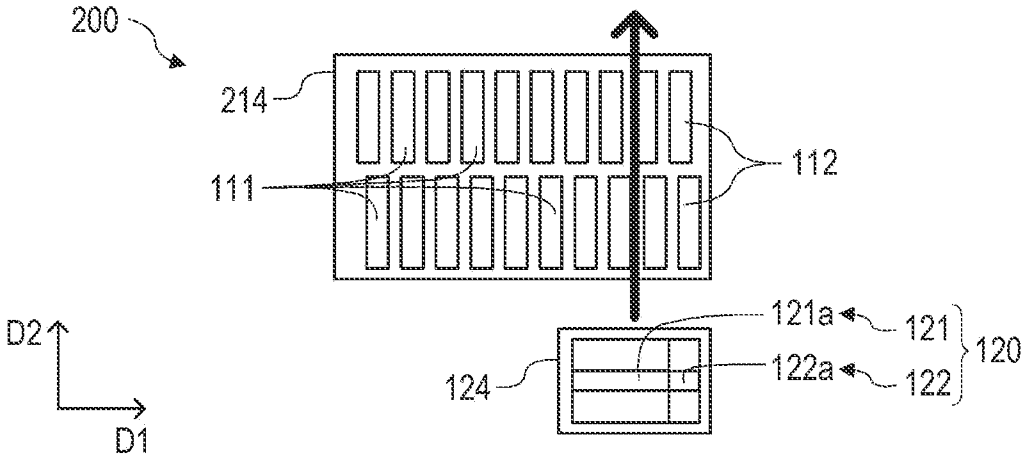
FIGS. 8A to 8C explanatorily illustrate a cleaning operation of an image forming apparatus according to a second embodiment.
Figure 8B:
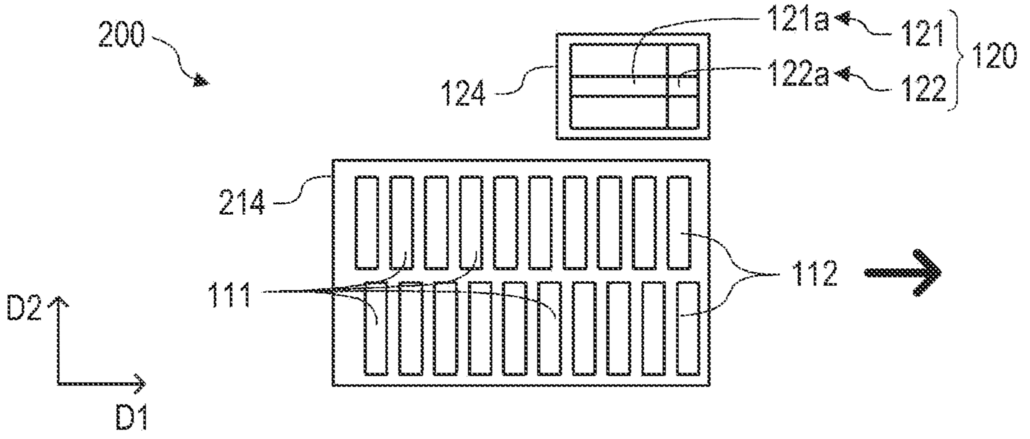
Figure 8C:
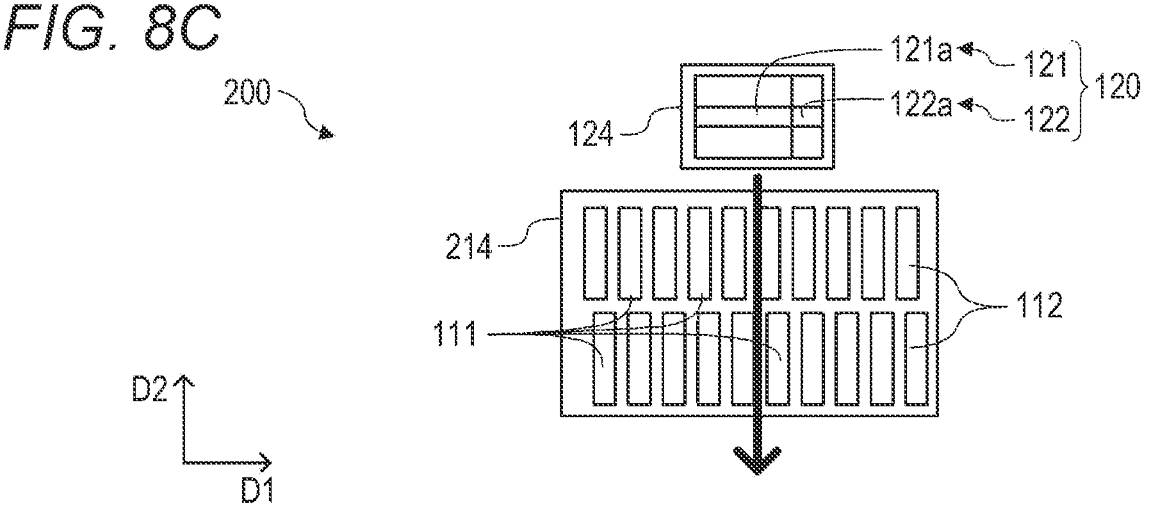
Figure 9:
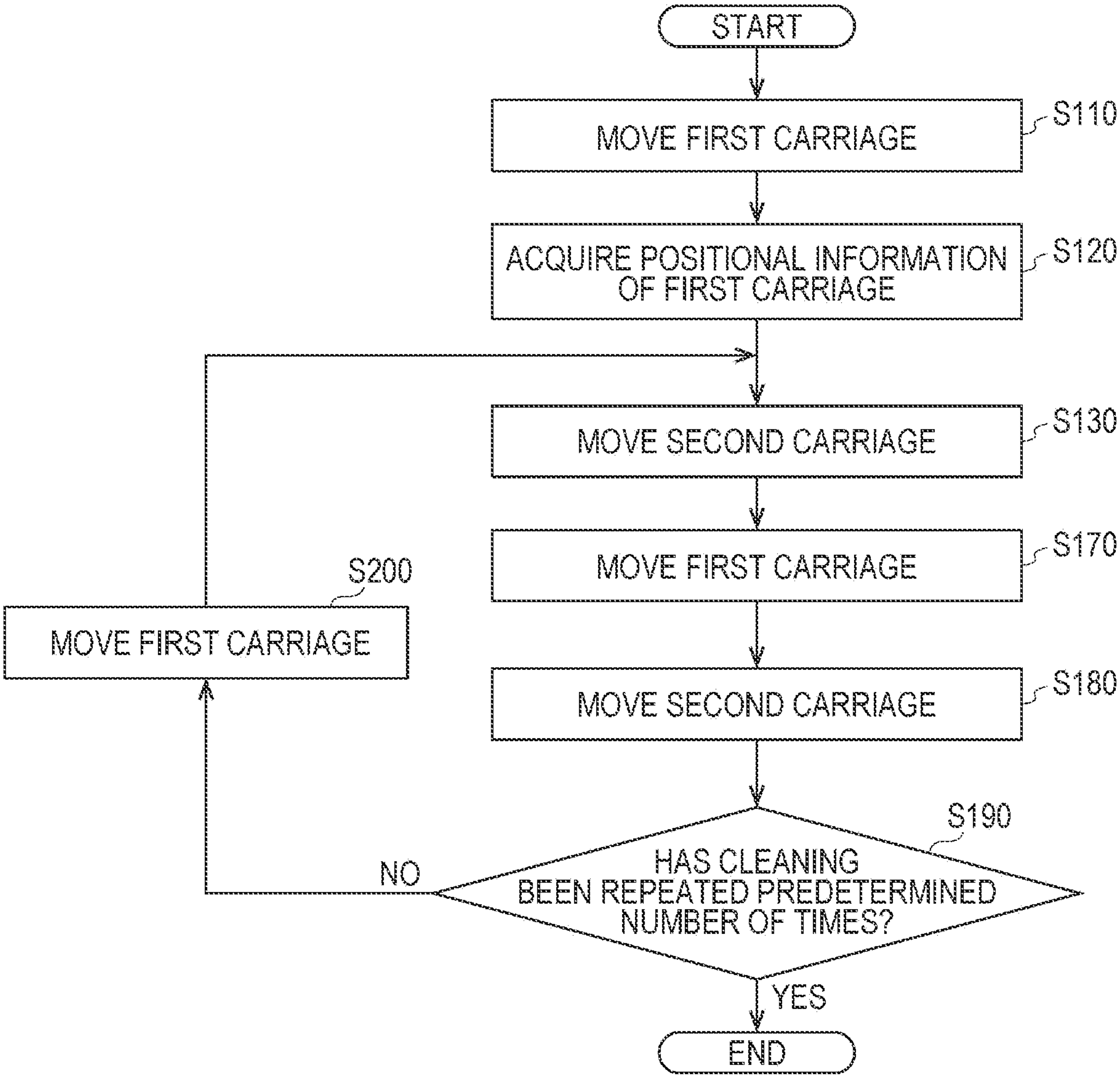
FIG. 9 is a flowchart illustrating the cleaning operation of the image forming apparatus according to the second embodiment.

FIGS. 8A to 8C explanatorily illustrate a cleaning operation of the image forming apparatus 200 according to the second embodiment. FIG. 9 is a flowchart illustrating the cleaning operation of the image forming apparatus 200 according to the second embodiment. FIGS. 8A to 8C illustrate the first carriage 214 and a second carriage 124.

As illustrated in FIGS. 8A to 8C, the image forming apparatus 200 in the present embodiment includes a first recording head 111, a second recording head 112, a first cleaning device 121, and a second cleaning device 122. The first recording head 111 and the second recording head 112 are mounted on the first carriage 214. The first cleaning device 121 and the second cleaning device 122 are mounted on the second carriage 124.

In the present embodiment, a plurality of first recording heads 111 and one second recording head 112 are arrayed in the main scanning direction D1, and a plurality of arrays (two arrays in the present embodiment) are disposed in the sub-scanning direction D2. The two recording-head arrays have a difference in position in the main scanning direction D1.

The first cleaning device 121 can clean three first recording heads 111, and the second cleaning device 122 can clean one second recording head 112. The first cleaning device 121 in the present embodiment cannot clean the entire of the recording head 110 in one cleaning operation (forward operation or backward operation).

As illustrated in FIGS. 8A and 9, a controller 150 causes the first carriage 214 to move to a position where cleaning is to be performed (S110), and acquires positional information of the first carriage 214 having moved (S120). Thereafter, the controller 150 causes the second carriage 124 to move in the sub-scanning direction D2 (forward operation: upward in the figure) (S130), and the first recording heads 111 and the second recording head 112 are cleaned.

As illustrated in FIGS. 8B and 9, the controller 150 causes the first carriage 214 to move in the main scanning direction D1 (S170). At this time, the controller 150 causes the first carriage 214 to move such that an uncleaned first recording head 111 is cleaned by the second cleaning device 122.

As illustrated in FIGS. 8C and 9, the controller 150 causes the second carriage 124 to move in the sub-scanning direction D2 (backward operation: downward in the figure) (S180). At this time, because there is no second recording head 112 to be cleaned, the second cleaning device 122 is retracted in the height direction D3 so as not to come into contact with the first recording heads 111. As a result, the first cleaning device 121 cleans the uncleaned first recording head 111.

Then, the controller 150 determines whether cleaning has been repeated predetermined number of times (S190). If the entire of the recording head 110 is already cleaned, the cleaning operation ends (S190; Yes). If the entire of the recording head 110 is not yet cleaned, the controller 150 causes the first carriage 214 to move in the main scanning direction D1 (S200), and step S130 to step S190 are repeated.

In such a manner, according to the image forming apparatus 200 of the present embodiment, the movement of the first carriage 214 in the main scanning direction D1 (rightward in the figure) and the movement of the second carriage 124 in the sub-scanning direction D2 (upward and downward in the figure) are repeated, so that the entire of the recording head 110 can be cleaned.

After the cleaning of the entire of the recording head 110 is completed, the controller 150 causes the second cleaning device 122 to move to its original position.

Effects

As described above, the image forming apparatus 200 of the present embodiment has effects similar to those of the image forming apparatus 100 of the first embodiment.

Third Embodiment

Next, an image forming apparatus 300 according to a third embodiment will be described. The image forming apparatus 300 of the present embodiment includes a recording head 110 on a first carriage 314. The recording head 110 on the first carriage 314 of the third embodiment are different in disposition from the recording head 110 on the first carriage 114 of the image forming apparatus 100 of the first embodiment. A cleaning device 120 on a second carriage 324 of the third embodiment is different in disposition from the cleaning device 120 on the second carriage 124 of the first embodiment. The components of the image forming apparatus 300 similar to those of the image forming apparatus 100 of the first embodiment are denoted with the same reference signs, and thus the description thereof will not be given.

(Configuration and Cleaning Operation of Image Forming Apparatus)

Figure 10:
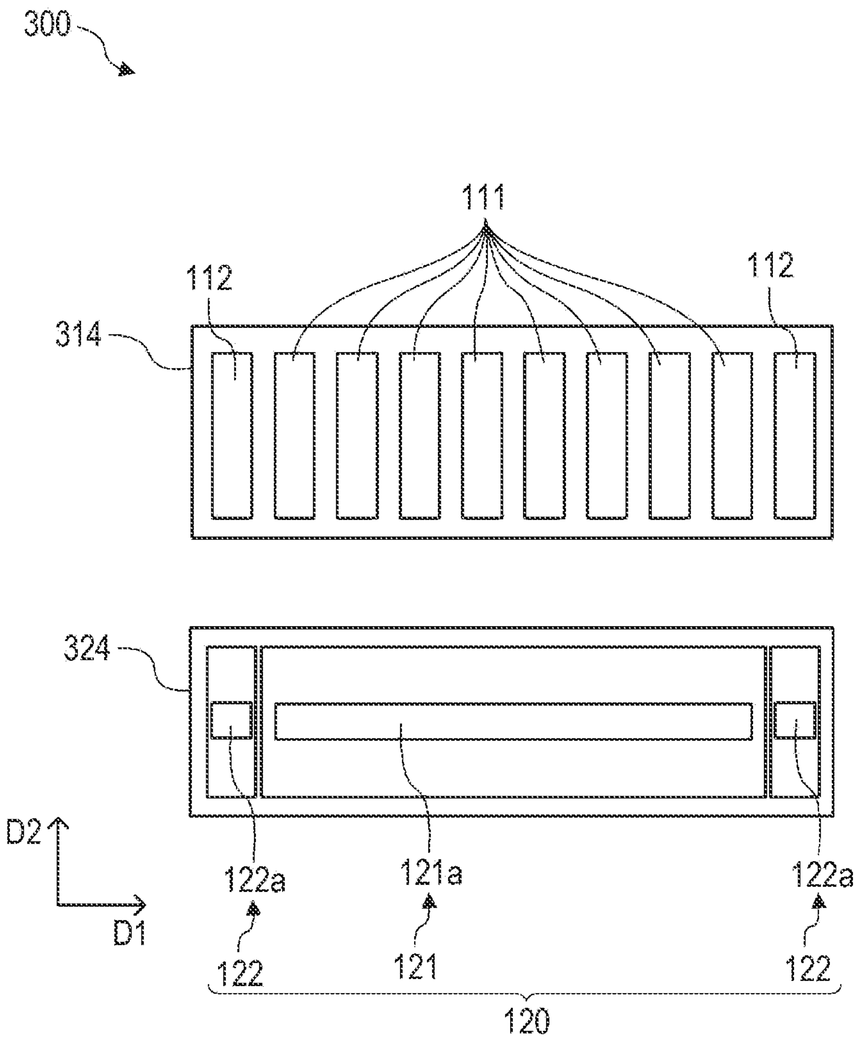
FIG. 10 illustrates the configuration of an image forming apparatus according to a third embodiment.

FIG. 10 illustrates the configuration of the image forming apparatus 300 according to the third embodiment.

As illustrated in FIG. 10, the image forming apparatus 300 in the present embodiment includes a first recording head 111, a second recording head 112, a first cleaning device 121, and a second cleaning device 122. The first recording head 111 and the second recording head 112 are mounted on the first carriage 314. The first cleaning device 121 and the second cleaning device 122 are mounted on the second carriage 324.

In the present embodiment, on the first carriage 314, a plurality of (eight) first recording heads 111 and two second recording heads 112 are arrayed in the main scanning direction D1. More specifically, one of the two second recording heads 112 is disposed adjacent to the leftmost first recording head 111 of the plurality of (eight) first recording heads 111, and the other one of the two second recording heads 112 is disposed adjacent to the rightmost first recording head 111 of the plurality of (eight) first recording heads 111. That is, the plurality of (eight) first recording heads 111 is interposed between the two second recording heads 112.

In the present embodiment, one first cleaning device 121 and two second cleaning devices 122 are mounted on the second carriage 324. More specifically, one of the second cleaning devices 122 is disposed at one end of the first cleaning device 121 and the other one of the second cleaning devices 122 is disposed at the other end of the first cleaning device 121. Namely, the one first cleaning device 121 is interposed between the two second cleaning devices 122.

In this case, a controller 150 causes the first carriage 314 to move to a position where cleaning is to be performed (S110), and acquires positional information of the first carriage 314 having moved (S120). Thereafter, the controller 150 causes the second carriage 324 to move in the sub-scanning direction D2 (forward operation: upward in the figure) (S130), and the first recording heads 111 and the second recording heads 112 are cleaned.

Effects

As described above, the image forming apparatus 300 of the present embodiment has effects similar to those of the image forming apparatus 100 of the first embodiment.

Fourth Embodiment

Next, an image forming apparatus 400 according to a fourth embodiment will be described. The image forming apparatus 400 of the present embodiment includes a recording head 110 on a first carriage 114. The recording head 110 on the first carriage 114 is different in disposition from the recording head 110 on the first carriage 114 of the image forming apparatus 100 of the first embodiment. The components of the image forming apparatus 400 similar to those of the image forming apparatus 100 of the first embodiment are denoted with the same reference signs, and thus the description thereof will not be given.

(Configuration and Cleaning Operation of Image Forming Apparatus)

Figure 11:
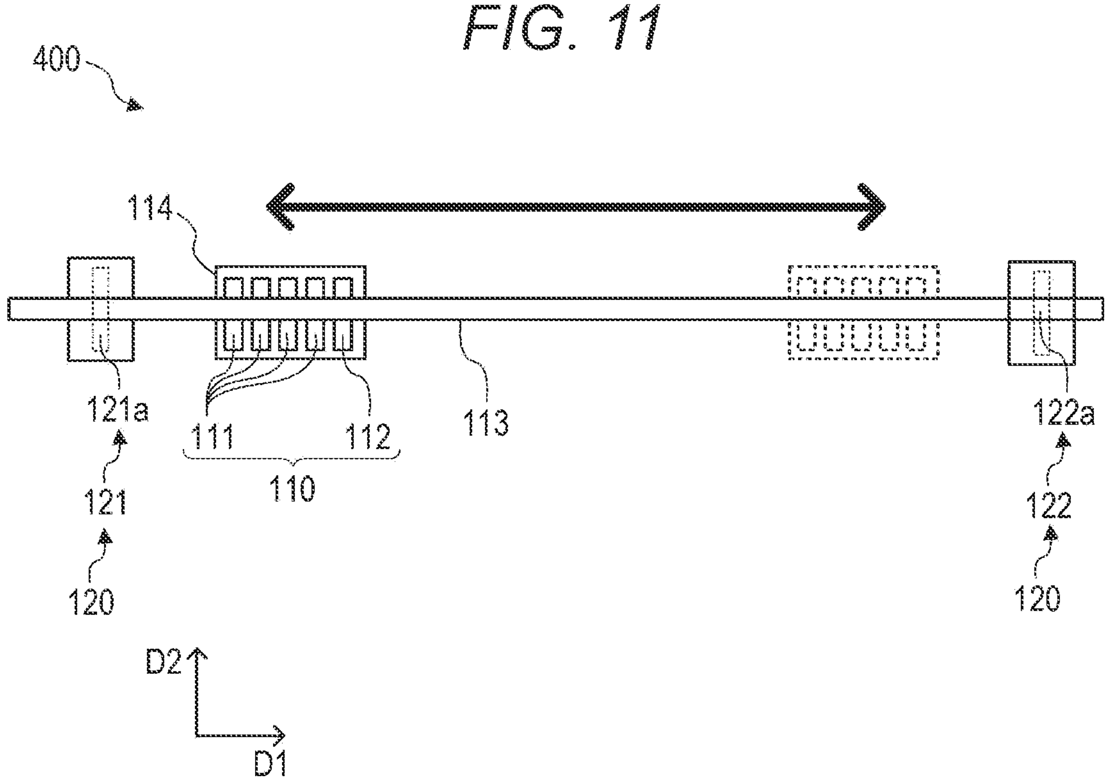
FIG. 11 illustrates the configuration of an image forming apparatus according to a fourth embodiment.

FIG. 11 explanatorily illustrates a cleaning operation of the image forming apparatus 400 of the fourth embodiment.

As illustrated in FIG. 11, the image forming apparatus 400 in the present embodiment includes a first recording head 111, a second recording head 112, a first cleaning device 121, and a second cleaning device 122. The first recording head 111 and the second recording head 112 are mounted on the first carriage 114, and the first cleaning device 121 and the second cleaning device 122 are fixed.

In the present embodiment, on the first carriage 114, a plurality of (four) first recording heads 111 and one second recording head 112 are arrayed in the main scanning direction D1. The first carriage 114 is preferably movable to the outside of an area for image formation on a recording medium by the recording head 110.

In the present embodiment, the first cleaning device 121 is disposed at one end outside the recording medium in the main scanning direction D1, and the second cleaning device 122 is disposed at the other end outside the recording medium in the main scanning direction D1. The first cleaning device 121 and the second cleaning device 122 are preferably disposed outside the area for image formation on the recording medium by the recording head 110. With this arrangement, cleaning is performed outside the area for image formation. Thus, the area for image formation is not contaminated in the case of a cleaning failure. The first cleaning device 121 can clean all the first recording heads 111 by one movement, and the number of second cleaning devices 122 is one.

In this case, a controller 150 causes the first carriage 114 to move in the main scanning direction D1 (leftward in the figure) to clean the first recording heads 111 by the first cleaning device 121, and causes the first carriage 114 to move in the main scanning direction D1 (rightward in the figure) to clean the second recording head 112 by the second cleaning device 122.

Effects

As described above, the image forming apparatus 400 of the present embodiment has effects similar to those of the image forming apparatus 100 of the first embodiment. In the image forming apparatus 400 of the present embodiment, the first cleaning device 121 and the second cleaning device 122 are fixed. Thus, the manufacturing cost can be reduced as compared with the image forming apparatus 100 of the first embodiment.

Fifth Embodiment (Configuration and Cleaning Operation of Image Forming Apparatus)

Figure 12:
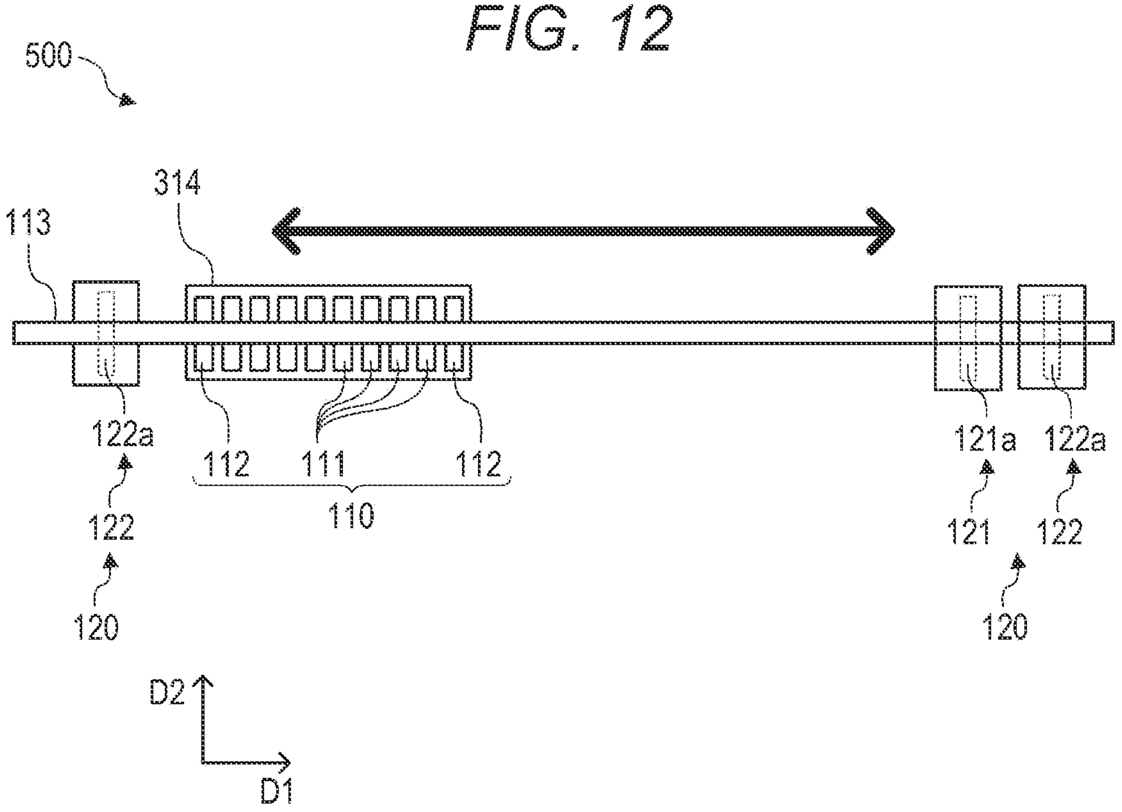
FIG. 12 illustrates the configuration of an image forming apparatus according a fifth embodiment.

FIG. 12 explanatory illustrates a cleaning operation of an image forming apparatus 500 of a fifth embodiment.

As illustrated in FIG. 12, the image forming apparatus 500 in the present embodiment includes a first recording head 111, a second recording head 112, a first cleaning device 121, and a second cleaning device 122. The first recording head 111 and the second recording head 112 are mounted on a first carriage 314, and the first cleaning device 121 and the second cleaning device 122 are fixed.

In the present embodiment, on the first carriage 314, a plurality of (eight) first recording heads 111 and two second recording heads 112 are arrayed in the main scanning direction D1. The first carriage 314 is preferably movable to the outside of an area for image formation on a recording medium by the recording head 110.

In the present embodiment, the first cleaning device 121 is disposed at one end outside the recording medium in the main scanning direction D1, and the second cleaning device 122 is disposed at the other end outside the recording medium in the main scanning direction D1. The first cleaning device 121 is movable in the height direction D3. The first cleaning device 121 and the second cleaning device 122 are preferably disposed outside the area for image formation on the recording medium by the recording head 110. With this arrangement, cleaning is performed outside the area for image formation. Thus, the area for image formation is not contaminated in the case of a cleaning failure.

In this case, a controller 150 causes the first carriage 314 to move in the main scanning direction D1 (rightward in the figure). At this time, the first cleaning device 121 remains retracted so as not to come into contact with the second recording heads 112 in the height direction D3. After the second recording head 112 passes, the first cleaning device 121 moves to a position where the first cleaning device 121 comes into contact with the second recording head 112. Then, the first cleaning device 121 cleans the first recording heads 111, and the second cleaning device 122 cleans the second recording heads 112.

Further, the controller 150 causes the first carriage 314 to move in the main scanning direction D1 (leftward in the drawing). Then, the first cleaning device 121 cleans the first recording heads 111, and the second cleaning device 122 cleans the second recording heads 112.

Effects

As described above, the image forming apparatus 500 of the present embodiment has effects similar to those of the image forming apparatus 100 of the first embodiment. In the image forming apparatus 500 of the present embodiment, the first cleaning device 121 is movable in the height direction D3 and the second cleaning device 122 is fixed. Thus, the manufacturing cost can be reduced as compared with the image forming apparatus 100 of the first embodiment.

The image forming apparatuses and the image forming methods according to the above embodiments enable reduction in maintenance cost without excessive maintenance. Therefore, according to the above embodiments, it is expected to spread an image forming apparatus and an image forming method that have low maintenance cost and good image quality of an image to be formed.

According to embodiments of the present invention, provided can be an image forming apparatus and an image forming method that enable maintaining long-duration cleaning performance.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus that discharges droplets, while moving a recording head relative to a recording medium in a main scanning direction and a sub-scanning direction, to form an image, the image forming apparatus comprising:

a carriage;

a first recording head that has a first discharge face having a hole, that is disposed on the carriage, that discharges a first droplet containing resin through the hole, and that is included in the recording head;

a second recording head that has a second discharge face having a hole, that is disposed on the carriage, that discharges, through the hole, a second droplet containing resin less than the resin contained in the first droplet, and that is included in the recording head;

a first cleaning device that wipes the first discharge face to clean the first recording head, the first cleaning device including a wet cleaner; and a second cleaning device that is different from the first cleaning device and that wipes the second discharge face to clean the second recording head, the second cleaning device including a dry cleaner.

2. The image forming apparatus according to claim 1, wherein the second droplet contains no resin.

3. The image forming apparatus according to claim 1, wherein a cleaning force of the first cleaning device to the first recording head is stronger than a cleaning force of the second cleaning device to the second recording head.

4. The image forming apparatus according to claim 1, wherein the first cleaning device includes a wet roller, and the second cleaning device includes a dry blade.

5. The image forming apparatus according to claim 1, wherein the first cleaning device is movable to the first recording head, and the second cleaning device is movable to the second recording head.

6. The image forming apparatus according to claim 1, wherein the first cleaning device cleans the first recording head immediately before or immediately after movement of the first recording head in the main scanning direction, and the second cleaning device cleans the second recording head immediately before or after movement of the second recording head in the main scanning direction.

7. The image forming apparatus according to claim 1, wherein the first cleaning device and the second cleaning device are movable integrally together, and in a case where the first cleaning device cleans the first discharge face of the first recording head, the second cleaning device is spaced apart from the second discharge face of the second recording head.

8. The image forming apparatus according to claim 1, wherein the first cleaning device and the second cleaning device are movable individually or simultaneously.

9. The image forming apparatus according to claim 1, wherein the first cleaning device is disposed at one end outside the recording medium in the main scanning direction, and the second cleaning device is disposed at another end outside the recording medium in the main scanning direction.

10. The image forming apparatus according to claim 1, wherein a number of times of cleaning of the first recording head performed by the first cleaning device is larger than a number of times of cleaning of the second recording head performed by the second cleaning device.

11. The image forming apparatus according to claim 1, wherein timing at which the second cleaning device cleans the second recording head is different from timing at which the first cleaning device cleans the first recording head.

12. The image forming apparatus according to claim 1, wherein the first cleaning device is connected to a first waste-liquid container for disposal of a first waste liquid having been wiped, and the second cleaning device is connected to a second waste-liquid container for disposal of a second waste liquid having been wiped.

13. An image forming method with the image forming apparatus according to claim 1 for image formation onto a recording medium, the image forming method comprising:

discharging droplets, with the first recording head and the second recording head moving relative to the recording medium in the main scanning direction and the sub-scanning direction, to form an image;

cleaning the first recording head by wiping, with the first cleaning device, the first discharge face; and cleaning the second recording head by wiping, with the second cleaning device, the second discharge face.

14. The image forming method according to claim 13, wherein a cleaning force of the first cleaning device to the first recording head in the cleaning the first recording head is stronger than a cleaning force of the second cleaning device to the second recording head in the cleaning the second recording head.

15. The image forming method according to claim 13, wherein the cleaning the first recording head includes cleaning, by the first cleaning device, the first recording head immediately before or immediately after main scanning, and the cleaning the second recording head includes cleaning, by the second cleaning device, the second recording head immediately before or immediately after main scanning.

16. The image forming method according to claim 13, wherein the first cleaning device and the second cleaning device are movable integrally together, and in the cleaning the first recording head, the second cleaning device is spaced apart from the second discharge face of the second recording head.

17. The image forming method according to claim 13, wherein the first cleaning device is disposed at one end outside the recording medium in the main scanning direction, the second cleaning device is disposed at another end outside the recording medium in the main scanning direction, the cleaning the first recording head includes cleaning, by the first cleaning device, the first recording head immediately before or immediately after main scanning, and the cleaning the second recording head includes cleaning, by the second cleaning device, the second recording head immediately before or immediately after main scanning.

18. The image forming method according to claim 13, wherein a number of times of cleaning the first recording head is larger than a number of times of the cleaning the second recording head.

19. The image forming method according to claim 13, wherein the cleaning the first recording head and the cleaning the second recording head are mutually different in timing.

* * * * *